United States Patent
Goekay et al.

(10) Patent No.: US 11,388,514 B2
(45) Date of Patent: Jul. 12, 2022

(54) METHOD FOR OPERATING A HEARING DEVICE, AND HEARING DEVICE

(71) Applicant: SIVANTOS PTE. LTD., Singapore (SG)

(72) Inventors: Umut Goekay, Koenigswinter (DE); Frank Naumann, Bubenreuth (DE); Henning Puder, Erlangen (DE)

(73) Assignee: Sivantos Pte. Ltd., Singapore (SG)

(*) Notice: Subject to any disclaimer, the term of this patent is extended or adjusted under 35 U.S.C. 154(b) by 13 days.

(21) Appl. No.: 17/018,281

(22) Filed: Sep. 11, 2020

(65) Prior Publication Data

US 2021/0076134 A1 Mar. 11, 2021

(30) Foreign Application Priority Data

Sep. 11, 2019 (DE) .............................. 102019213809

(51) Int. Cl.
| | |
|---|---|
| *H04R 3/04* | (2006.01) |
| *G06F 9/54* | (2006.01) |
| *G10L 21/0232* | (2013.01) |
| *G10L 25/78* | (2013.01) |
| *H04R 1/10* | (2006.01) |

(52) U.S. Cl.
CPC .............. *H04R 3/04* (2013.01); *G06F 9/542* (2013.01); *G10L 21/0232* (2013.01); *G10L 25/78* (2013.01); *H04R 1/1083* (2013.01); *G10L 2025/783* (2013.01)

(58) Field of Classification Search
CPC ........ H04R 3/04; H04R 1/1083; H04R 25/50; H04R 25/505; H04R 25/603; H04R 2460/01; H04R 2460/05; H04R 1/406; H04R 3/005; G06F 9/542; G10L 21/0232; G10L 25/78; G10L 2025/783; G10K 11/1781; G10K 11/1785
See application file for complete search history.

(56) References Cited

U.S. PATENT DOCUMENTS

| | | | |
|---|---|---|---|
| 8,275,624 B2 * | 9/2012 | Kehoe | G10L 21/0364 600/23 |
| 9,654,855 B2 | 5/2017 | Ring et al. | |
| 10,602,268 B1 * | 3/2020 | Soto | H04R 1/406 |
| 10,631,105 B2 * | 4/2020 | Nielsen | H04R 25/50 |
| 11,032,653 B2 * | 6/2021 | Fung | H04R 25/305 |

(Continued)

FOREIGN PATENT DOCUMENTS

| | | |
|---|---|---|
| CN | 101356854 A | 1/2009 |
| CN | 104717593 A | 6/2015 |

(Continued)

*Primary Examiner* — Yogeshkumar Patel
(74) *Attorney, Agent, or Firm* — Laurence A. Greenberg; Werner H. Stemer; Ralph E. Locher

(57) ABSTRACT

A method operates a hearing device in present surroundings such that noise cancellation of the hearing device is activated, so that ambient sounds are reduced for a user of the hearing device. A desired value for the voice volume of the user is determined for the present surroundings. An actual value for the voice volume of the user is measured. If the actual value is lower than the desired value, the hearing device takes a measure to prompt the user to speak more loudly. Additionally, a hearing device is configured to implement the method.

13 Claims, 2 Drawing Sheets

(56) References Cited

U.S. PATENT DOCUMENTS

| | | | |
|---|---|---|---|
| 2004/0267524 A1* | 12/2004 | Boillot | G10L 21/04 704/E21.017 |
| 2008/0317268 A1 | 12/2008 | Nordahn et al. | |
| 2011/0046435 A1* | 2/2011 | Jensen | H04R 25/505 600/28 |
| 2011/0054241 A1* | 3/2011 | Jensen | G10L 25/84 600/28 |
| 2011/0116666 A1* | 5/2011 | Dittberner | H04R 25/407 381/313 |
| 2014/0257799 A1 | 9/2014 | Shepard | |
| 2015/0172831 A1 | 6/2015 | Dittberner et al. | |
| 2016/0127829 A1 | 5/2016 | Ring et al. | |
| 2016/0162254 A1* | 6/2016 | Benattar | G10K 11/17837 700/94 |
| 2016/0163303 A1* | 6/2016 | Benattar | G10K 11/17857 381/71.11 |
| 2018/0227676 A1* | 8/2018 | Glavin | H04R 25/505 |
| 2019/0028803 A1* | 1/2019 | Benattar | H04S 7/304 |
| 2019/0080708 A1* | 3/2019 | Mohan | G10L 25/84 |
| 2019/0320946 A1* | 10/2019 | Bromwich | H04R 3/04 |
| 2019/0364374 A1* | 11/2019 | Jensen | H04R 25/75 |
| 2020/0162825 A1* | 5/2020 | El Guindi | G10L 21/0208 |

FOREIGN PATENT DOCUMENTS

| | | |
|---|---|---|
| CN | 107005757 A | 8/2017 |
| CN | 109493877 A | 3/2019 |
| CN | 109859767 A | 6/2019 |
| DE | 102009019594 A1 | 7/2010 |

* cited by examiner

METHOD FOR OPERATING A HEARING DEVICE, AND HEARING DEVICE

CROSS-REFERENCE TO RELATED APPLICATION

This application claims the priority, under 35 U.S.C. § 119, of German application DE 10 2019 213 809, filed Sep. 11, 2019; the prior application is herewith incorporated by reference in its entirety.

BACKGROUND OF THE INVENTION

Field of the Invention

The invention relates to a method for operating a hearing device and to a corresponding hearing device.

A hearing device is used to reproduce sounds for a user of the hearing device. To this end, the user wears the hearing device on or in his or her ear. To output sounds, the hearing device has a receiver. In some embodiments, the hearing device also has at least one microphone to pick up sounds from the surroundings and then to output the sounds to the user. The sounds are typically additionally modified by the hearing device in the process, e.g. in order to compensate for a hearing loss in the user. In general, however, a hearing device is understood in the present case to mean not just hearing devices for users with impaired hearing, but also headphones and the like.

A hearing device can have for example active noise cancellation, ANC for short, by means of which ambient sounds are cancelled, so that the user of the hearing device perceives his or her surroundings to be quieter than they actually are. However, this regularly leads to the user also selecting his or her voice volume when speaking to be correspondingly low, so that he or she is more difficult for interlocutors to understand, especially on account of the additional ambient sounds. A similar effect can also arise in a hearing device with a beamformer if ambient sounds are masked for the user by means of very narrow focusing of the beamformer.

BRIEF SUMMARY OF THE INVENTION

Against this background, it is an object of the invention to improve the intelligibility of a user of a hearing device that has noise cancellation, particularly in loud surroundings. To this end, an improved method for operating a hearing device and a corresponding hearing device are intended to be specified.

The object is achieved according to the invention by a method having the features according to the independent method claim and by a hearing device having the features according to the independent device claim. Advantageous embodiments, developments and variants are the subject of the subclaims. The explanations in connection with the method also apply mutatis mutandis to the hearing device, and vice versa.

The method is used for operating a hearing device. The hearing device is operated in specific surroundings, which are also referred to as present surroundings, at a given time. These surroundings are primarily characterized by ambient sounds, i.e. the sounds in the vicinity of the user, e.g. background sound, other human beings, machine or plant sounds and the like, but specifically possibly also noise. Any sounds are also referred to as sound signals. To output possibly modified ambient sounds to the user, the hearing device has a receiver. The receiver, when used as intended, is inserted into an ear of the user, for example, or is worn on or behind the ear, the output sounds then being directed into the ear e.g. via a sound tube of the hearing device.

In the present case, noise cancellation of the hearing device is activated, so that ambient sounds, specifically noise, are reduced for a user of the hearing device, i.e. the level of the sounds is decreased. The ambient sounds pass by the hearing device into the auditory canal of the user, for example, specifically pass by an earmold of the hearing device, and are therefore inherently not picked up and output again by the hearing device, but rather bypass the hearing device. The hearing device accordingly has noise cancellation, which is also expediently able to be switched on and off and, depending on requirements, is automatically or manually activable or activated by the user, in particular in the presence of noise. The noise cancellation preferably distinguishes between interference, for example background sounds, noise and the like, and wanted sounds, for example voice or music, and is in a form such that interference is reduced in comparison with wanted sounds.

The method involves a desired value for the voice volume of the user being determined for the present surroundings. The desired value is also referred to as desired volume and indicates that level that is preferably reached by the user in the present surroundings in order to ensure adequate intelligibility, in particular for other people in the surroundings and specifically for interlocutors of the user. The desired value selected and used in specific surroundings is ascertained either as part of the method or outside of the method in a separate calibration method and then e.g. stored in a memory of the hearing device and retrieved by the hearing device when required. The desired value is preferably user-specific and is then determined individually for the applicable user, so that different desired values may be obtained for different users.

Further, the method involves an actual value for the voice volume, i.e. an actual volume, of the user being measured. This is accomplished by using a microphone, which is in particular a part of the hearing device. In other words: the voice of the user is picked up by means of the microphone, and the level of the voice is then measured. The actual value therefore indicates by and large how loudly the user is actually speaking.

If the actual value is lower than the desired value, the hearing device takes a measure to prompt the user to speak more loudly. However, it is fundamentally left to the user himself or herself to also react appropriately to the measure, that is to say to actually also speak more loudly and thereby to match the actual value to the desired value. It is initially sufficient for the measure to be fundamentally suitable for consciously or unconsciously prompting the user to increase his or her voice volume relative to the present voice volume. It is accordingly essential to the method that it is detected when the user is speaking too softly and that the hearing device reacts thereto, whereas the actual measure as a reaction to speaking too softly is initially unimportant.

It is accordingly a core concept of the invention in particular to initially compare the actual value and the desired value in order to establish whether the user of the hearing device is speaking too softly for the present surroundings. If this is the case, an attempt is then made to prompt the user to speak more loudly by means of a suitable measure. This advantageously at least partially compensates for the effect of a reduced voice volume on account of noise cancellation. This significantly improves the intelligibility of the user for interlocutors of the user in particularly loud environments, since the voice volume of the user is optimally matched to the present surroundings despite the noise cancellation. Use of the method is appropriate specifically when the noise cancellation is switched on, since the effect of softer speaking arises predominantly in this case. The matching of the voice volume is undertaken by the user himself or herself, either consciously or unconsciously, i.e. the hearing device itself contributes to increasing the voice volume not directly, but rather merely indirectly by using the measure to prompt the user to effect such an increase in the voice volume. Various measures are fundamentally suitable for this purpose, a few particularly preferred instances of which are described more specifically below.

Fundamentally, the method therefore contains three steps. A first step involves the desired value being determined, i.e. the present surroundings of the user are examined and the voice volume of the user that is necessary in order to render the user intelligible in the present surroundings is ascertained. In other words: an examination of the surroundings is performed with the aim of determining a desired volume for the user. This involves, in a suitable embodiment, the volume of ambient sounds, specifically preferably noise, being measured and then taken into consideration. In other words: the level of the ambient sounds is used to characterize the present surroundings. In a particularly suitable embodiment, this is accomplished by measuring the signal-to-noise ratio, SNR for short, of the voice of the user in relation to the ambient sounds. The SNR thus then indicates the volume of the ambient sounds relative to the voice volume of the user. Alternatively or additionally, an embodiment in which the surroundings are classified by means of a classifier, i.e. are assigned to a class, and the desired value is then determined by selecting the desired value on the basis of the class is also suitable.

A second step involves the present voice volume of the user being determined, i.e. the actual value. This expediently involves own voice detection, OVD for short, being used, i.e. own voice detection is used to selectively isolate the user's own voice and then to determine the volume of the voice, that is to say the voice volume, particularly reliably. The own voice detection is in particular a part of the hearing device. The first and second steps can be carried out in any order and also simultaneously, and in each case either as a one-off or recurrently.

A third step involves the actual value and the desired value being taken as a basis for taking a measure that prompts, to be more precise: is intended to prompt, the user to increase the actual volume so as to bring himself or herself closer to or to reach the desired volume. In particular, this is accomplished by forming the difference between the desired value and the actual value and then taking this difference as a basis for prompting or not prompting the measure. Accordingly, in a manner of speaking automatic control is implemented in which the voice volume of the user is a controlled variable and in which, on the basis of the difference between the actual and desired volumes, the measure outputs a manipulated variable in order to influence the user and hence the controlled variable.

The method is preferably performed in a conversation situation in which the user is alternately speaking with one or more other people. In those phases in which the user himself or herself is speaking, the actual value is then expediently measured and then immediately or later compared with the desired value in order to trigger the measure if necessary.

In a particularly preferred embodiment, the noise cancellation is active noise cancellation, also referred to as ANC for short. When the active noise cancellation is switched on, the ambient sounds are picked up by a microphone of the hearing device and compensated for by the noise cancellation by means of additional anti-sounds such that the ambient sounds are reduced in the perception of the user, that is to say have a decreased level. Expediently, the noise cancellation for the ambient sounds distinguishes between noise, which is attenuated, and wanted sounds, which are not attenuated or at least attenuated less relative to the noise.

As an alternative or in addition to active noise cancellation, a beamformer is also suitable as noise cancellation, which, by focusing on a subsector of the surroundings, reduces or masks out such ambient sounds as are outside the subsector. In this respect, a distinction is drawn here between noise signals and wanted signals, in particular on the basis of the direction from which the respective ambient sound comes.

Preferably, the desired value is determined, using a function, on the basis of a signal-to-noise ratio, namely on the basis of the actual volume of the user in relation to the volume of the ambient sounds. The signal-to-noise ratio is also referred to simply as SNR for short and indicates the ratio of the level of the user's own voice to the level of the ambient sounds. The function is in a form such that a higher desired value is used as the SNR decreases, i.e. in particular also as the volume of the ambient sounds increases. The volume of the ambient sounds is expediently measured in such phases in which the user himself or herself is not speaking. It is alternatively possible and suitable to measure while the user is speaking, in which case the user's own voice is attenuated or filtered out accordingly. The desired value for the present surroundings is therefore determined by virtue of the SNR of the present surroundings being ascertained, for which purpose in particular the actual value and the volume of the ambient sounds are measured, and by virtue of the function also being used to calculate the desired value for the ascertained SNR or to look up said desired value in a database. The function is accordingly expediently stored as a computation rule or as a table in a memory in particular of the hearing device. By and large, the desired value is therefore selected, depending on the surroundings, such that the level of the user's own voice in comparison with the level of the ambient sounds is taken into consideration when determining the desired value. The louder the user's own voice in comparison with the surroundings, the less requirement there is to take the measure. Accordingly, the function is in a form such that a higher desired value is determined and therefore prespecified for a lower SNR, so that the user is thus also intended to speak more loudly in louder surroundings.

Preferably, the function is in the form of a Lombard increase curve. The Lombard increase curve is user-dependent and indicates for the respective user how the voice volume of said user behaves as a function of the SNR if no noise cancellation is activated. In other words: the Lombard increase curve indicates the individual, natural matching of the voice volume to the volume of the ambient sounds.

In a particularly preferred embodiment, above a limit SNR (i.e. limit signal-to-noise ratio) the desired value used is a quiescent value that corresponds to an average voice volume of the user in quiet surroundings, and below the limit SNR the desired value is determined from the quiescent value using the function. The function is then therefore used to determine the desired value only if the surroundings have a specific minimum volume relative to the voice volume of the user. It is assumed that below this minimum volume and hence above the limit SNR the ambient sounds are so soft that the user speaks at his or her average voice volume in quiet surroundings and that this is then also adequate for these surroundings. The limit SNR accordingly defines two ranges, namely a soft range above the limit SNR and a loud range below the limit SNR, so that all surroundings are thus distributed over two types, as it were, namely quiet and loud surroundings. In the soft range, i.e. for quiet surroundings, the average voice volume of the user in quiet surroundings is adequate, which means that there is no need for measures to correct the voice volume and such a measure is also not taken. It is assumed that the user speaks at his or her average voice volume. The desired value used is accordingly the quiescent value, as it were, to which the actual value then usually also corresponds, which means that there is no need for a measure. In the loud range, i.e. in loud surroundings, on the other hand, the average voice volume of the user in quiet surroundings is not adequate to be heard sufficiently in the correspondingly loud surroundings, since the noise cancellation is preferably activated in loud surroundings, which means that there is then the risk of the user speaking too softly, this being checked by measuring the actual value and comparing it with the desired value. If the user is actually speaking too softly, the applicable measure is taken. In the loud range, it also holds in particular that as the surroundings become louder a higher voice volume is also needed, which means that the function increases accordingly in this range as the SNR becomes lower, and thus an ever higher voice volume of the user is demanded.

The quiescent value is user-dependent and is therefore expediently individually prespecified for the user and, to this end, measured in a suitable manner. Moreover, in particular the limit SNR is dependent on the quiescent value, since the higher the quiescent value the louder the ambient sounds can be without a measure to prompt louder speaking needing to be taken. Accordingly, the limit SNR is also user-dependent. Depending on the user, the loud range is then sometimes reached for different SNRs. In a two-dimensional graph of the desired value as a function of the SNR the quiescent value then results in a horizontal curve in the soft range for high SNRs, whereas in the loud range it then results in a curve that rises toward lower SNRs, which sets out from the quiescent value, as a result of which the quiescent value thus by and large forms a minimum. Since the function may also be user-dependent, the limit SNR is then accordingly also dependent on the function. In general, however, the limit SNR is obtained in particular as a point of intersection between the quiescent value and the function, namely as that SNR at which the desired value, which is prespecified using the function, exceeds the quiescent value, that is to say if the average voice volume in quiet surroundings corresponds to the voice volume that is at least necessary. Expediently, a soft transition at the point of intersection is in a form such that the measure is absolutely not taken abruptly when the limit SNR is reached or exceeded, but rather the measure is taken much more gradually with increasing intensity, beginning with arrival at or a drop below the limit SNR or already a little, e.g. 3 dB, above the limit SNR. In this way, the soft and loud ranges are then not distinctly separate from one another, but rather there is a crossfade between the two ranges, which is more agreeable for the user.

It is fundamentally possible to simply prespecify the desired value and, to this end, depending on the embodiment, to prespecify particularly the function, the quiescent value or both. Preferably, however, the desired value is measured individually for the user before or during operation of the hearing device. This has the advantage that the individual voice characteristic of the user is automatically taken into consideration as well. By way of example, not every user also speaks at the same volume for given ambient sounds. Such a difference is then advantageously taken into consideration by measuring the desired value. The desired value is measured either by means of the hearing device itself or separately therefrom in a calibration method, e.g. using a measurement system configured in a suitable manner therefor, e.g. by an audiologist. Essentially, the desired value does not necessarily have to be measured during the method; instead, it is sufficient for the desired value to be determined during the method and, to this end, to be e.g. calculated or looked up in a database on the basis of the present surroundings. Expediently, a calibration method is performed in advance of actual use in a fitting session for adjusting the hearing device to suit the user, the calibration method involving the desired value initially being measured, i.e. particularly the function or the quiescent value or both, depending on the embodiment.

Preferably, the quiescent value is measured as an average voice volume of the user in quiet surroundings. Quiet surroundings are understood to mean in particular surroundings with a signal-to-noise ratio of at least 10 dB. The average voice volume is then calculated as a mean value from multiple measurements of the voice volume in quiet surroundings. In a suitable embodiment, the quiescent value is measured during operation of the hearing device, in particular continuously or recurrently at regular intervals. In general, but specifically when the quiescent value is measured during operation, own voice detection is advantageously used in order to ensure that the volume of the user's own voice is actually determined and the measurement is not distorted by alien voices. The own voice detection is accordingly in a form in particular such that it highlights the user's own voice in comparison with other ambient sounds.

Preferably, the function is measured in advance of regular operation of the hearing device and in a calibration method e.g. during a fitting session and is then e.g. stored in the hearing device for later determination of the desired value during operation. The Lombard increase curve is measured for example by virtue of the user being played ambient sounds at different volume by means of headphones and the voice volume of the user being measured during this.

In a preferred embodiment, the surroundings are classified by means of a classifier and assigned to a class, and the desired value is determined by virtue of said desired value being selected on the basis of the class. The classifier is in particular a part of the hearing device. The classifier in particular analyzes the ambient sounds and determines the class therefrom, e.g. own voice, alien voice, voice in quiet surroundings, voice with noise, music, only noise or the like. The desired value associated with a respective class is expediently stored in a memory and is then retrieved by the hearing device and used. Expediently, the classifier is configured to classify the present surroundings either as loud or quiet surroundings, so that the desired value is then determined in loud surroundings using the function as described and corresponds to the quiescent value in quiet surroundings.

In a preferred embodiment, the actual value is determined by virtue of the voice volume being measured by means of an external microphone of the hearing device and in an own voice phase, in which the user himself or herself is speaking. The external microphone, when the hearing device is used as intended, is arranged outside the ear canal of the user and regularly accommodated in a housing of the hearing device. The housing is worn on, in or behind the ear. The external microphone is preferably used during operation of the hearing device to pick up the ambient sounds for the purpose of amplification and output to the user. The embodiment with an external microphone and measurement of the actual value during an own voice phase is based on the consideration that the level of the user's own voice, that is to say the actual value, can be measured particularly reliably in such an own voice phase. Expediently, this involves own voice detection being used, which reduces all other sounds apart from the user's own voice and hence increases the accuracy of the measurement of the actual value. In particular, the own voice phase is also detected by means of own voice detection. The own voice detection is in particular a part of the hearing device.

In a preferred embodiment, the actual value is determined by virtue of the voice volume being measured by means of an internal microphone of the hearing device in the ear canal of the user. An internal microphone is also referred to as a structure-borne sound microphone and has the advantage that, in contrast to an external microphone, it picks up the user's own sounds, above all the voice of the user, in amplified fashion. As a result, an internal microphone is particularly suited to accurate measurement of the actual value. A combination with own voice detection as described in connection with an external microphone above is also advantageous in this instance.

Insofar as the desired value is measured, the same microphone is expediently used for this as for measuring the actual value.

In addition to the measurement of the actual value, a background level is expediently also measured, i.e. the volume of the ambient sounds, preferably outside an own voice phase. Preferably, an average background level is measured by virtue of the background level being averaged over time.

As was already indicated earlier on, various measures are suitable for prompting the user to increase the voice volume. A few particularly advantageous measures are described more precisely below. In a suitable embodiment, multiple instances of the measures are combined with one another.

In an advantageous embodiment, the measure contains the user's own voice being output to said user at reduced volume. The voice of the user is processed by the hearing device in the same way as all other ambient sounds and amplified on the basis of a prespecified gain profile. In order to prompt the user to speak more loudly, the user's own voice is output more softly than would be usual on the basis of the actual gain profile for the user. In particular the volume of his or her own voice is reduced relative to the ambient sounds. This is based on the observation that one's own voice volume is normally adjusted by any speaker on the basis of the perception of his or her own voice volume, that is to say that the voice that is heard usually serves as feedback for adjusting the voice volume. If it is difficult to hear oneself, it can be assumed that other people can also hear one only with difficulty. This individual feedback mechanism is then used to prompt the user to increase his or her voice volume, possibly even unconsciously. The user's own voice is expediently output to the user correspondingly more softly as the difference between the desired value and the actual value increases.

To reduce the volume of the user's own voice, for example a spatial filter is placed in the speaking direction of the user, which means that ambient sounds from the speaking direction, i.e. primarily the user's own voice, are thus output to the user with less intensity than ambient sounds from other directions. Spatial filtering of the mouth area of the user is particularly expedient, which means that an interlocutor in front of the user particularly does not become softer but rather as far as possible just the user's own voice has its volume reduced. The spatial filtering is preferably implemented by means of beamforming, i.e. by means of directional processing of the sounds that are picked up by the hearing device. Sounds from the mouth area of the user are reduced by a directional filter placed in the mouth area. The directional filter is also referred to as a "spatial notch".

In an advantageous embodiment, the measure contains the noise cancellation being reduced or deactivated. Suitably, detection of a conversation situation, e.g. by means of a classifier as already described, results in the noise cancellation being automatically reduced or deactivated. In general, the ambient sounds are then thus rejected to a lesser extent or no longer at all, which means that, by making use of the feedback mechanism described above, the user independently increases the voice volume in order to adapt himself or herself to the now subjectively louder ambient sounds. Expediently, the noise cancellation is reduced to a correspondingly greater extent as the difference between the desired value and the actual value increases. So as not to completely relinquish the effect of noise cancellation particularly in loud surroundings, the noise cancellation is expediently not reduced or deactivated as a whole, but rather merely selectively for one or more frequency ranges, so that maximum effective noise cancellation then continues to take place in the remaining frequency ranges.

In an advantageous embodiment, the measure comprises the hearing device itself, or indirectly via an external device, outputting advice to the user that the user is speaking too softly. The external device is e.g. a smartphone coupled to the hearing device via a data connection. The measure accordingly contains the output of advice or the transmission of an applicable command to the external device to output advice. The advice is for example visual, audible or haptic advice, e.g. a vibration, a text message or a light signal. Whether the user heeds the advice is left to the user himself or herself, however; instead, what is relevant is that the user is actively informed about his or her excessively low voice volume in some form. In the long term, this even possibly results in a learning effect such that the user automatically speaks more loudly when noise cancellation is active, and a measure by the hearing device is then no longer necessary.

In an advantageous embodiment, the measure comprises the hearing device outputting a psychoacoustic additional sound to the user. The additional sound is output to the user in particular via a receiver of the hearing device. This is based on the consideration of, as an alternative to the already described passing of already existing ambient sounds or the reduction of the user's own voice, additionally producing a sound that subjectively increases the volume of the ambient sounds in the present surroundings for the user in comparison with the actual volume. Expediently, the additional sound is output at a level that is selected and set on the basis of the difference between the desired value and the actual value.

The psychoacoustic additional sound is distinguished in particular by virtue of it producing a subliminal, that is to say subjectively unperceived, sensation of loudness. The psychoacoustic additional sound is in a form in particular such that it is not sensed as a nuisance by the user per se but still contributes to the loudness perceived by the user, which means that the user then speaks more loudly than without the additional sound in accordance with the aforementioned feedback mechanism. Suitable psychoacoustic additional sounds are for example single or combined low-frequency tones, i.e. in particular sound signals at a frequency of below 20 Hz, i.e. such tones that are not consciously heard but still contribute to the sound pressure and hence to the perceived volume. A suitable psychoacoustic additional sound is likewise modulated noise, e.g. white noise or pink noise, which is likewise typically not perceived as a nuisance and also does not adversely influence speech intelligibility.

A hearing device according to the invention has a control unit, also referred to as a controller. The control unit is configured to perform a method as described above. Preferably, the control unit is accommodated in a housing of the hearing device, and the housing is worn by the user on, in or behind the ear when the hearing device is used as intended. The noise cancellation and, if present, the own voice detection and the classifier are each implemented by an applicable computing unit, the respective computing units each expediently being integrated in the control unit of the hearing device.

The hearing device is preferably a hearing device for compensating for a hearing deficiency in the user, i.e. the hearing device is configured to modify the ambient sounds in order to counteract the hearing deficiency. To this end, the ambient sounds are typically amplified by means of an amplification unit of the hearing device or frequency-shifted by means of a compressor of the hearing device, or a combination of these. The modification is effected on the basis of frequency, in particular. The amplification unit and the compressor are in particular parts of the control unit.

Essentially, the concepts described are also, conversely, analogously applicable to a situation in which the user speaks too loudly and is then intended to be prompted by a suitable measure to speak more softly. In an expedient embodiment, the hearing device accordingly takes a measure to prompt the user to speak more softly if the actual value is higher than a second desired value, which is in particular above the desired value described hitherto, which is then a first desired value. The first and second desired values therefore define three ranges, namely a first range in which the user speaks too softly, a second range in which the speaking volume of the user is neither too soft nor too loud, and a third range in which the user speaks too loudly. Depending on the range that the actual value is in, the hearing device then performs a suitable measure in order to prompt the user to adapt his voice volume accordingly.

The measures already cited can analogously also be applied to the case in which a speaker is too loud. By way of example, the user then has his own voice output more loudly.

Other features which are considered as characteristic for the invention are set forth in the appended claims.

Although the invention is illustrated and described herein as embodied in a method for operating a hearing device, and a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
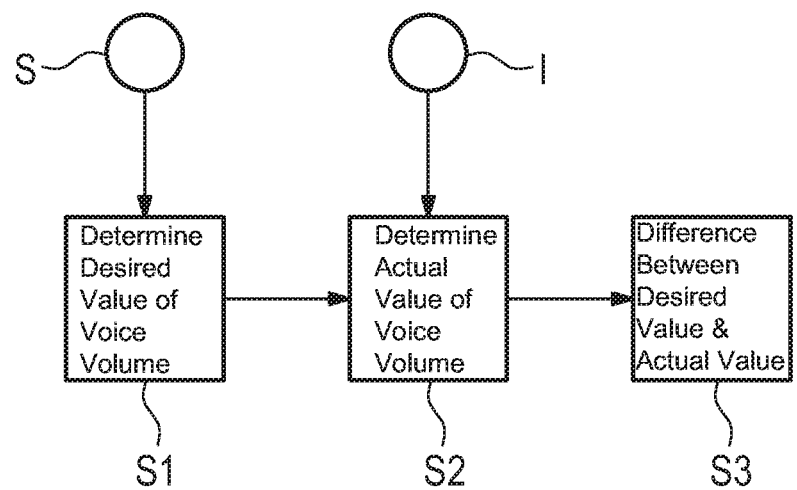
FIG. 1 is a block diagram used for explaining a method for operating a hearing device.
Figure 2:
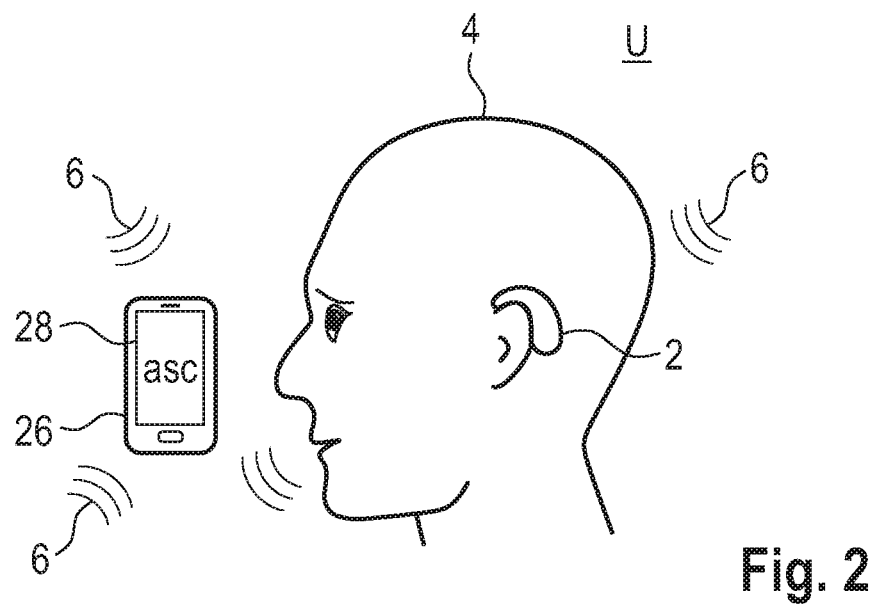
FIG. 2 is an illustration showing a user with a hearing device in surroundings.
Figure 3:
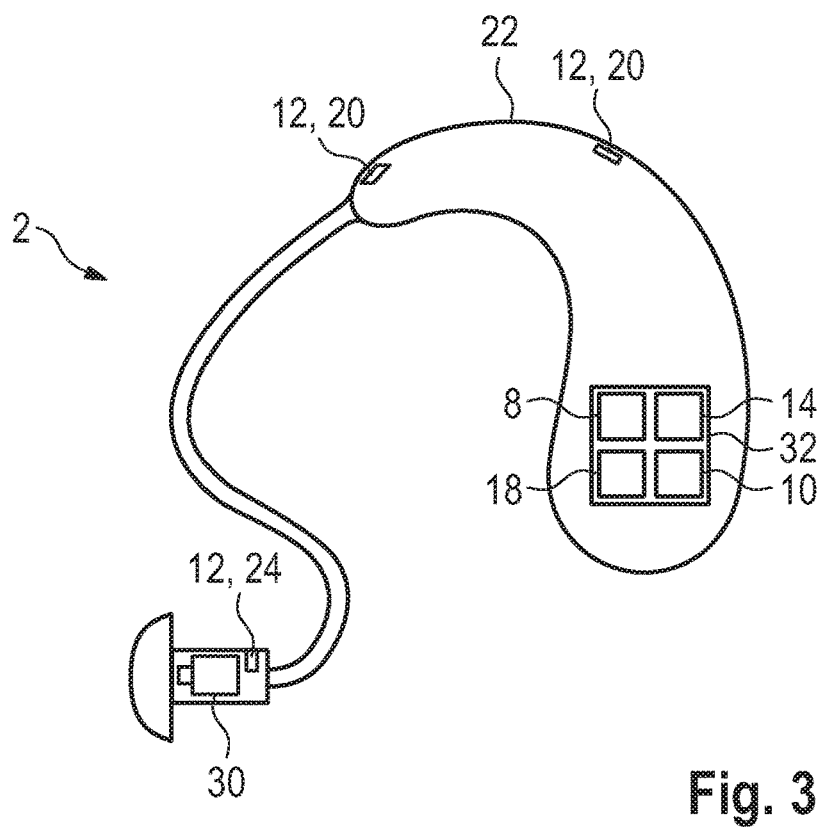
FIG. 3 is an illustration showing the hearing device from FIG. 2.

Referring now to the figures of the drawings in detail and first, particularly to FIG. 1 thereof, there is shown a flowchart for a method for operating a hearing device 2. FIG. 2 shows the hearing device 2 suitable therefor when used as intended by a user 4 in surroundings U, which are also referred to as present surroundings. FIG. 3 shows the hearing device 2 in detail. The surroundings U are primarily characterized by ambient sounds 6. In the present case, noise cancellation 8 of the hearing device 2 is activated, so that ambient sounds 6, specifically noise, are reduced for the user 4. The noise cancellation 8 is able to be switched on and off as required, either automatically, manually or both.

In the method shown in FIG. 1, a first step S1 involves a desired value S for the voice volume of the user 4 being determined for the present surroundings U. The desired value S is also referred to as desired volume and indicates that level that is preferably reached by the user 4 in the present surroundings U in order to ensure adequate intelligibility, e.g. for other people in the surroundings. To this end, the present surroundings U are examined and the voice volume of the user 4 that is necessary in order to render him or her intelligible in the present surroundings U is ascertained. In the present case, the signal-to-noise ratio, SNR for short, of the voice of the user 4 in relation to the ambient sounds 6 is measured. The SNR indicates the volume of the ambient sounds 6 relative to the voice volume of the user 4. Alternatively or additionally, the surroundings U are classified by means of a classifier 10, i.e. are assigned to a class, and the desired value S is then selected on the basis of the class.

A second step S2 of the method involves an actual value I for the voice volume, i.e. an actual volume, of the user 4 being measured. This is accomplished by using a microphone 12 of the hearing device. To be more precise, the voice of the user 4 is picked up by means of the microphone 12 and then the level of the voice is measured. The actual value I therefore indicates by and large how loudly the user 4 is actually speaking. In the present case, this involves own voice detection 14, OVD for short, being used, by means of which the voice of the user 4 is selectively isolated so as then to determine the volume of the voice. The own voice detection is a part of the hearing device 2 in this case.

A third step S2 of the method involves checking whether the actual value I is lower than the desired value S, and, if this is the case, the hearing device 2 takes a measure to prompt the user 4 to speak more loudly. However, it is left to the user 4 himself or herself to react to the measure, that is to say to actually speak more loudly. In the present case, the third step S3 involves the difference between the desired value S and the actual value I being formed and then this difference being taken as a basis for prompting or not prompting the measure. Hence, in a manner of speaking automatic control is implemented in which the voice volume of the user 4 is a controlled variable and in which, on the basis of the difference between the actual and desired volumes, the measure outputs a manipulated variable in order to influence the user 4.

Essentially, the method therefore comprises three steps S1, S2, S3. In a departure from the exemplary embodiment of FIG. 1, the first step S1 and the second step S2 can be carried out in any order and also simultaneously, and in each case either as a one-off or recurrently.

The noise cancellation 8 in the exemplary embodiment shown is active noise cancellation, also referred to as ANC for short. When the active noise cancellation is switched on, the ambient sounds 6 are picked up by means of a microphone 12 of the hearing device 2 and compensated for by the noise cancellation 8 by means of additional anti-sounds such that the ambient sounds 6 are reduced in the perception of the user 4. In a variant that is not shown, as an alternative or in addition to active noise cancellation, the noise cancellation 8 used is a beamformer, which, by focusing on a subsector of the surroundings U, reduces or masks out such ambient sounds 6 as are outside the subsector.

Figure 4:
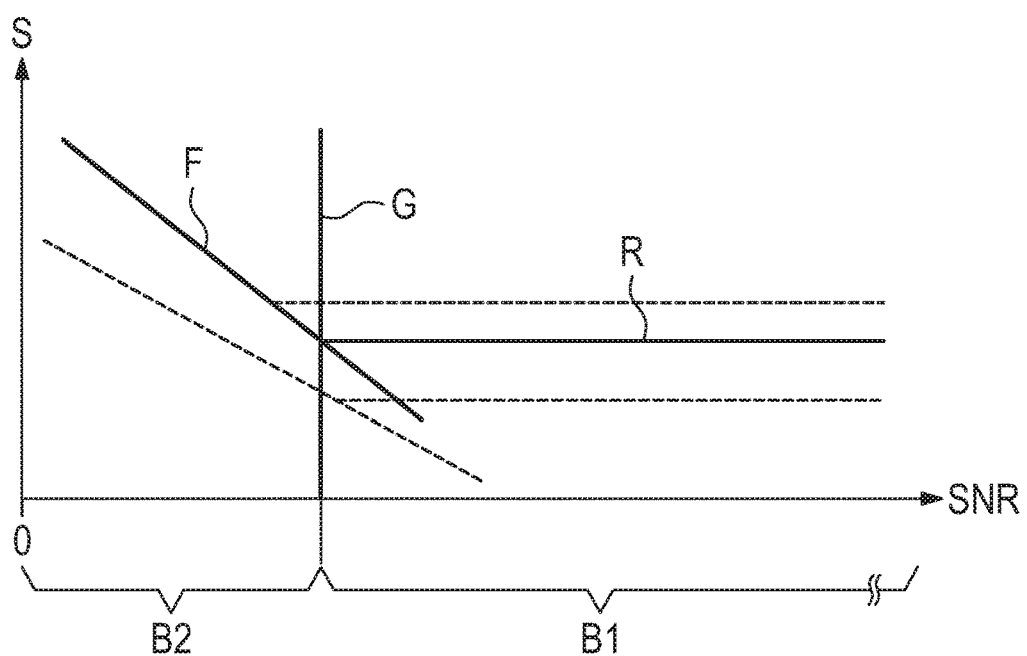
FIG. 4 is a graph showing a desired value as a function of a signal-to-noise ratio.

The desired value S in the present case is determined, using a function F, on the basis of a signal-to-noise ratio, namely on the basis of the actual volume of the user 4 in relation to the volume of the ambient sounds 6. The signal-to-noise ratio is referred to as SNR for short and indicates the ratio of the level of the user's 4 own voice to the level of the ambient sounds 6. An exemplary function F is shown in FIG. 4 and in a form such that, as the volume increases, i.e. at a lower SNR, a higher desired value S is used. The desired value S for the present surroundings U is then determined by virtue of the SNR of the present surroundings U being ascertained, for which purpose the actual value I and the volume of the ambient sounds 6 are measured, and by virtue of the function F also being used to calculate or look up the desired value S for the ascertained SNR. The function F is stored as a computation rule or as a table in a memory 18 of the hearing device 2 in this case. In the present example, the function F is also particularly in the form of a Lombard increase curve and indicates on the basis of the user how the voice volume of the user 4 behaves as a function of the SNR if no noise cancellation 8 is activated.

Moreover, FIG. 4 reveals that, in the exemplary embodiment shown, above a limit SNR G the desired value S used is a quiescent value R that corresponds to an average voice volume of the user 4 in quiet surroundings U. Below the limit SNR G, on the other hand, the desired value S is determined from the quiescent value R using the function F, which means that said function is thus used to determine the desired value S only if the surroundings U have a specific minimum volume relative to the voice volume of the user 4. Above the limit SNR G the ambient sounds 6 are so soft that the average voice volume of the user 4 in quiet surroundings U is adequate. The limit SNR G, as is clear from FIG. 4, defines two ranges, namely a soft range B1 above the limit SNR G and a loud range B2 below the limit SNR G. In the soft range B1, i.e. for quiet environments U, the average voice volume of the user 4 is adequate, which means that there is no need for measures for correcting the voice volume and such a measure is also not taken. The desired value S used is accordingly the quiescent value R, as it were. In the loud range B2, i.e. in loud surroundings U, on the other hand, the average voice volume of the user 4 is not adequate to be heard sufficiently, since the noise cancellation 8 is activated and there is therefore the risk of the user 4 speaking too softly. As the surroundings U become louder in the present case a higher voice volume is also needed, which means that the function F increases accordingly in this loud range B2 as the SNR becomes lower, as a result of which an ever higher voice volume of the user 4 is demanded.

FIG. 4 shows just a single instance of many possible examples of the function F and the quiescent value R, since these two parameters are typically user-dependent. As such, the function F and the quiescent value R can be shifted independently of one another in the vertical direction in comparison with the example of FIG. 4, depending on the user 4. The function F may moreover also have been shifted in the horizontal direction, have a different gradient or else a different shape than the straight one shown. Alternative possible quiescent values R and functions F are indicated by dashed lines in FIG. 4.

It is also evident that the limit SNR G is dependent on the quiescent value R and also on the function F, since the higher the quiescent value R the louder the ambient sounds 6 can be without a measure to prompt louder speaking needing to be taken. Accordingly, the limit SNR G is also user-dependent, which means that, depending on the user 4, the loud range B2 is sometimes reached for different SNRs. In the two-dimensional graph shown in FIG. 4 for the desired value S as a function of the SNR the quiescent value R then results in a horizontal curve in the soft range B1 for high SNRs, as shown, whereas in the loud range B2 it then results in a curve that rises toward lower SNRs, namely the function F, which sets out from the quiescent value R, as a result of which said quiescent value by and large forms a minimum. In general, the limit SNR G is obtained as a point of intersection between the quiescent value R and the function F, namely as that SNR at which the desired value S, which is prespecified using the function F, exceeds the quiescent value R, that is to say if the average voice volume in quiet surroundings U corresponds to the voice volume that is at least necessary. A sharp transition is formed at this point of intersection in the present case, whereas in a variant that is not shown a contrastingly soft transition is in a form such that the measure is absolutely not taken abruptly when the limit SNR G is reached or exceeded, but rather the measure is taken gradually with increasing intensity, beginning with arrival at or a drop below the limit SNR G or already a little, e.g. 3 dB, above the limit SNR G.

In a variant, the desired value S is simply prespecified and this is accomplished by prespecifying particularly the function F and the quiescent value R. Alternatively or additionally, the desired value S, particularly the function F and the quiescent value R, is measured individually for the user 4 before or during operation of the hearing device 2, however. The desired value S is measured by means of the hearing device 2 itself or separately therefrom in a calibration method or both. The quiescent value R in the present case is measured as an average voice volume of the user 4 in quiet surroundings U, quiet surroundings U in the present case being understood to mean surroundings U with an SNR of at least 10 dB. In one possible variant, the own voice detection 14 is used in this case to ensure that the volume of the user's 4 own voice is actually determined. The function F is measured in advance of regular operation of the hearing device 2 in a calibration method e.g. during a fitting session in the present case and is then stored in the hearing device 2 for later determination of the desired value S during operation. In a variant that is not shown, the function F is alternatively or additionally measured during operation of the hearing device 2.

In one variant of the exemplary embodiment, the surroundings U are classified by means of the classifier 10 and assigned to a class, and the desired value S is determined by virtue of the desired value being selected on the basis of the class. To this end, the classifier 10 analyzes the ambient sounds 6 and determines the class therefrom, e.g. own voice, alien voice, voice in quiet surroundings, voice with noise, music, only noise or the like.

In another variant of the exemplary embodiment, the actual value I is determined by virtue of the voice volume being measured by means of an external microphone 20 of the hearing device 2 and in an own voice phase, in which the user 4 himself or herself is speaking. The external microphone 20 in this case is identical to the microphone 12 already described. When the hearing device 2 is used as intended the external microphone 20 is arranged outside the ear canal of the user 4 and accommodated in a housing 22 of the hearing device 2, as is evident from FIGS. 2 and 3. The housing 22 is worn on, in or behind the ear. The external microphone 22 is also used during operation of the hearing device 2 in the present case to pick up the ambient sounds 6 for the purpose of amplification and output to the user 4 to compensate for a hearing deficiency.

In another variant of the exemplary embodiment, the actual value I is determined by virtue of the voice volume being measured by means of an internal microphone 24 of the hearing device 2 in the ear canal of the user 4. In contrast to the external microphone 20, the internal microphone 24 picks up the user's 4 own sounds in amplified fashion. In a variant that is not shown, the internal microphone 24 is combined with the own voice detection 14 as described in connection with the external microphone 20 above.

Various measures are suitable to prompt the user 4 to increase the voice volume. A few measures are described in more detail below. They are combinable with one another.

In one variant of the exemplary embodiment, the measure contains the user's 4 own voice being output to said user at reduced volume. The voice of the user 4 is processed by the hearing device 2 in the same way as all other ambient sounds 6 and amplified on the basis of a prespecified gain profile. So as now to prompt the user 4 to speak more loudly, the user's own voice is now output more softly than would be usual on the basis of the actual gain profile for the user 4, so that the volume of his or her own voice relative to the ambient sounds 6 is thus reduced. Since the perception of one's own voice regularly serves as feedback for any speaker to adjust the voice volume, the user 4 will automatically speak more loudly when his or her own voice is reduced. This individual feedback mechanism is used in the present case.

In another variant of the exemplary embodiment, the measure comprises the noise cancellation 8 being reduced or deactivated, so that the ambient sounds 6 are then thus rejected to a lesser extent or no longer at all and, by making use of the feedback mechanism described above, the user 4 independently increases the voice volume. In a variant thereof, the noise cancellation 8 is not reduced or deactivated as a whole, but rather merely selectively for one or more frequency ranges.

In another variant of the exemplary embodiment, the measure comprises the hearing device 2 itself, or indirectly via an external device 26, outputting advice 28 to the user 4 that the user is speaking to softly. The external device 28 in FIG. 2 is a smartphone coupled to the hearing device 2 via a data connection. The measure accordingly includes the output of advice 28 for example via a receiver 30 of the hearing device 2 or the transmission of an applicable command to the external device 26 to output advice 28. The advice 28 is for example visual, audible or haptic advice.

In another variant of the exemplary embodiment, the measure comprises the hearing device 2 e.g. using the receiver 30 to output a psychoacoustic additional sound to the user 4 that produces a subliminal, that is to say subjectively unperceived, sensation of loudness. The psychoacoustic additional sound is in a form such that it is not sensed as a nuisance by the user 4 per se but still contributes to the perceived loudness, which means that the aforementioned feedback mechanism is used. The psychoacoustic additional sound is for example a low-frequency tone at a frequency of e.g. below 20 Hz. In another example, the psychoacoustic additional sound is modulated noise, e.g. white noise or pink noise.

The hearing device 2 shown has a control unit 32, also referred to as a controller. The control unit 32 is configured to perform the method as described above. The control unit 32 is accommodated in the housing 22. The noise cancellation 8, the own voice detection 14 and the classifier 10 are each implemented by an applicable computing unit and integrated in the control unit 32. In the present case, the hearing device 2 is designed to compensate for a hearing deficiency of the user 4 and, to this end, has an amplification unit, not shown in more detail, which is likewise integrated in the control unit 32.

LIST OF REFERENCE SIGNS 2 hearing device
4 user
6 ambient sound
8 noise cancellation
10 classifier
12 microphone
14 own voice detection
18 memory
20 external microphone
22 housing
24 internal microphone
26 external device
28 advice
30 receiver
32 control unit
B1 soft range
B2 loud range
F function
G limit SNR
I actual value
R quiescent value
S desired value
SNR signal-to-noise ratio
S1 first step
S2 second step
S3 third step
U surroundings

The invention claimed is:

1. A method for operating a hearing device in present surroundings, which comprises the steps of:
classifying the present surroundings by means of a classifier and the present surroundings are assigned to a class;
activating noise cancellation of the hearing device so that ambient sounds are reduced for a user of the hearing device;
determining a desired value for a voice volume of the user for the present surroundings on a basis of the class; and
measuring an actual value for the voice volume of the user using a microphone, and if the actual value is lower than the desired value, the hearing device takes a measure to prompt the user to speak more loudly.

2. The method according to claim 1, wherein the noise cancellation is active noise cancellation.

3. The method according to claim 1, which further comprises determining the desired value using a function on a basis of a signal-to-noise ratio (SNR), namely on a basis of the actual value in relation to a volume of the ambient sounds, wherein the function is in a form such that a higher desired value is used as the signal-to-noise ratio (SNR) decreases.

4. The method according to claim 3, wherein the function is in a form of a Lombard increase curve.

5. The method according to claim 3, wherein above a limit SNR the desired value used is a quiescent value that corresponds to an average voice volume of the user in quiet surroundings, and wherein below the limit SNR the desired value is determined from the quiescent value using the function.

6. The method according to claim 1, which further comprises determining the actual value by virtue of the voice volume being measured by means of an external microphone of the hearing device and in an own voice phase, in which the user himself or herself is speaking.

7. The method according to claim 1, which further comprises determining the actual value by virtue of the voice volume being measured by means of an internal microphone of the hearing device in an ear canal of the user.

8. The method according to claim 1, wherein the measure taken includes a user's own voice being output to the user at a reduced volume.

9. The method according to claim 1, wherein the measure taken includes the noise cancellation being reduced or deactivated.

10. The method according to claim 1, wherein the measure taken includes the hearing device itself, or indirectly via an external device, outputting a message to the user that the user is speaking too softly.

11. The method according to claim 1, wherein the measure taken includes the hearing device outputting a psychoacoustic additional sound to the user.

12. The method according to claim 1, wherein the desired value is a first desired value and the hearing device takes a measure to prompt the user to speak more softly if the actual value is higher than a second desired value.

13. A hearing device, comprising:
a controller for performing a method for operating the hearing device in present surroundings, said controller configured to:
classify the present surroundings by means of a classifier and the present surroundings are assigned to a class;
activate noise cancellation of the hearing device so that ambient sounds are reduced for a user of the hearing device;
determine a desired value for a voice volume of the user for the present surroundings on a basis of the class; and
measure an actual value for the voice volume of the user using a microphone, and if the actual value is lower than the desired value, the hearing device takes a measure to prompt the user to speak more loudly.

* * * * *